3,041,311
POLYPROPYLENE STABILIZED WITH A DITHIO-
PHOSPHATE METAL SALT
Bernard O. Baum, Plainfield, N.J., assignor to Union
Carbide Corporation, a corporation of New York
No Drawing. Filed Dec. 3, 1958, Ser. No. 777,863
7 Claims. (Cl. 260—45.75)

This invention relates to polyolefin compositions having improved stability at elevated temperatures. More particularly, it relates to improved polypropylene compositions which are capable of withstanding high temperatures without undue molecular degradation.

One of the principal reasons for the continuing interest in polypropylene by those concerned with industrial synthetic polymers is that its relatively high melting point, of the order of 170° C. to 180° C., indicates a potential use for this polymer in the fabrication of articles of commerce which remain dimensionally unchanged at temperatures appreciably higher than can be tolerated by articles formed from polyethylene.

Unlike polyethylene, however, which has a melting point of from about 105° C. to 135° C., depending on the method of polymerization employed, polypropylene is extremely susceptible to thermal degradation at high temperatures and cannot in fact withstand the ordinary hot compounding and processing operations without sustaining serious impairment of its physical properties. The term "high temperatures" as used herein is intended to mean temperatures of the order of 500° F. (260° C.) and above. Temperatures of this magnitude are necessary to carry out many of the conventional forming processes e.g., injection molding, with polypropylene because of the high melting point of this polymer. At these temperatures the molecular degradation is so severe as to reduce the physical properties to unacceptable levels.

A well-known general approach in attempting to prevent undue thermal degradation in circumstances such as described above is to admix with the given polymer a material which, in a manner not completely understood, exerts a stabilizing influence on the polymer. Although polyethylene is in many ways similar to polypropylene in physical and chemical properties, it has been found that many stabilizers highly effective in the case of polyethylene are completely unsuitable as stabilizers for polypropylene. In some instances generally excellent polyethylene stabilizers have been found actually to aggravate the instability of polypropylene at the high temperatures concerned in the present invention.

It is therefore the general object of the present invention to provide a polypropylene composition which is capable of withstanding elevated temperatures without undue molecular degradation.

It is a further object to provide a polypropylene composition which can be formed at suitably high temperatures with no significant reduction in appearance, strength properties, or electrical characteristics.

These and other objects which will be obvious from the specification are accomplished in accordance with the present invention by admixing with polypropylene a small amount of a dithiophosphate salt having the general formula:

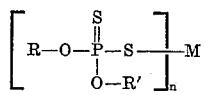

wherein M is a metal selected from Groups I–A, II–A, II–B and IV–B of the Mendeleeff Periodic System of Elements, $n$ is equal to the valence of the metal, and R and R' are each selected from the group consisting of an alkyl group containing from 1 to 16 carbon atoms, an aryl and substituted aryl group containing from 6 to 16 carbon atoms, and a cycloalkyl or substituted cycloalkyl containing at least 5 carbon atoms in the cycloalkyl ring and having not more than 16 carbon atoms in all.

Organic groups illustrative of this general group are methyl, ethyl, isopropyl, tertiary butyl, hexyl, octyl, hexadecyl, phenyl, tolyl, ethylphenyl, tertiary butylphenyl, hexylphenyl, naphthyl, ethylnaphthyl, cyclopentyl, cyclohexyl, tertiary butylcyclopentyl, isopropyl cyclohexyl and the like.

Illustrative of the metal groups suitably employed are Li, Na, K, Mg, Ca, Ba, Zn, Cd, Hg, Pb, and Sn.

The stabilizers described above may be prepared by methods well known in the art. Conveniently the corresponding dithiophosphoric acid may be prepared by refluxing phosphorus pentasulfide and the primary alcohol compound of the R group concerned, i.e., R—OH or a mixture of R—OH and R'—OH if R and R' are different radicals, in an inert solvent medium such as benzene. The dithiophosphoric acid may then be converted to the desired salt by reaction with a basic salt of the metal within the aforesaid suitable class. Such salts include those of weak organic acids, such as acetates which hydrolyze to form metal hydroxides. Metal hydroxides per se may also be used.

The polypropylene compositions containing one or more of the dithiophosphate salts described above sustain in general a greatly lessened degree of molecular weight degradation when exposed to high temperatures than otherwise is the case when polypropylene alone is so thermally treated. Some of the dithiophosphate salt additives virtually eliminate thermal degradation altogether. These stabilizers on the other hand, do not substantially alter the strength or electrical properties of the polymer.

Small quantities of these stabilizers have been found to be adequate to effectively stabilize the polypropylene at high temperatures. The preferred amount employed is in the range of about 0.01 to about 2.0 parts by weight per 100 parts by weight of polypropylene. Particularly preferred amounts are in the range of about 0.05 to about 0.5 part stabilizer per 100 parts polymer on a weight basis.

Incorporation of the dithiophosphate salts into the polymeric propylene is accomplished by conventional methods using such apparatus as a roll mill, Banbury mixer, or the like. Advantageously the polypropylene is mechanically worked at a temperature only just sufficiently high, i.e., about 170° C. to 180° C. to achieve a fluxed material of formable consistency before the stabilizer is added. This procedure permits a minimum of processing to obtain an intimate mixture of the composition constituents.

The excellent stabilizing action at high temperatures of the dithiophosphate salts of the present invention is all the more surprising since it has been found that they do not effectively stabilize polypropylene at lower temperatures. By way of illustration, 100 parts by weight of a propylene homopolymer having a melt index of 5 (as determined by ASTM test method D–1238–57T) and a density of 0.90 was fluxed and sheeted on a two roll mill at 170° C. Potassium diisopropyldithiophosphate in an amount of 0.5 part by weight was then added to the sheet on the mill and thoroughly mixed thereinto by successively removing the sheet from the rolls and end-passing it through the nip of the mill rolls ten times. A portion of this composition was compression molded into a 30 mil thick plaque and suspended in a circulating air oven maintained at 150° C. Periodically the plaque was examined and subjected to a manually applied bending force. The plaque reacted to the induced stress in one of two ways—either showing no discernible ill effect, or crumbling into small powdery fragments. Embrittlement, as indicated by crumbling, occurred before 6 hours had elapsed.

A more detailed illustration of the invention is set forth in the following examples.

EXAMPLE I

One hundred parts by weight of a propylene homopolymer having a melt index of 5 (as determined by ASTM test method D–1238–57T) and a density of 0.9 was fluxed and sheeted on a two roll mill at 170° C. Potassium diisopropyldithiophosphate in an amount of 0.5 part by weight was then added to the sheet on the mill and blended by successively removing the sheet from the rolls and end-passing it through the nip of the mill rolls about ten times. The thermal stability of the composition at a high temperature was determined by placing a 10 gram sample of the composition in a preheated cylindrical metal cell formed by closing off the bottom (exit) orifice of an extrusion plastometer of the same design and dimensions as the melt index measuring apparatus described in ASTM D–1238–57T. The temperature of the preheated cell was 300° C. A plug weighing 100 grams was placed directly on the resin composition and kept in the cell at 300° C. for 15 minutes. At the end of this time, the melt index of the composition was determined to be about 16 (ASTM D–1238–57T).

EXAMPLE II

Additional compositions consisting of polypropylene and a dithiophosphate salt high temperature stabilizer were prepared according to the same procedures as set forth in Example I and tested for embrittlement time and molecular degradation at high temperatures. Additionally a control sample of polypropylene having admixed therewith 4,4'-thio bis-(6-tert-butyl-m-cresol), which is generally regarded as an excellent thermal stabilizer for polypropylene, was tested. In all instances polypropylene having an initial melt index of 5 was used and the quantity of modifier employed was 0.5 part by weight per 100 parts by weight of polypropylene. The results are shown in Table I. Embrittlement time was determined by compression molding the compositions into 30 mil thick plaques and suspending these plaques in a circulating air oven at 150° C. Embrittlement is indicated by a crumbling of the plaque under a manually applied bending stress.

is most surprising in view of the fact that the same compounds do not stabilize polypropylene at lower temperatures, e.g., 150° C. as shown by the time to embrittlement data. Even more surprising is the fact that 4,4'-thiobis-(6-tert-butyl-m-cresol) does prevent embrittlement of polypropylene at 150° C. but is completely ineffectual (actually injurious) in polypropylene at high temperatures.

The foregoing examples are intended solely for the purposes of illustration and not by way of limitation. It is further to be understood that various other additives which do not impair the stabilizing action of the dithiophosphate salts may be incorporated into the compositions in the conventional manner. Such additives include fillers, pigments, processing aids, lubricants, corrosion inhibitors, and the like.

The propylene polymers which are effectively stabilized at high temperatures in accordance with the present invention are those which are normally solid at room temperature and may be produced according to any of the several methods known in the art. Exemplary of such processes are those described in Australian patent application No. 6365/55 to Phillips Petroleum Company, United States Patent No. 2,692,259 to Edwin F. Peters, and United States Patent No. 2,791,576 to Edmund Field.

What is claimed is:

1. A heat stabilized polypropylene composition resistant to molecular degradation at high temperatures which comprises normally solid polypropylene and a stabilizing amount of a dithiophosphate salt having the general formula:

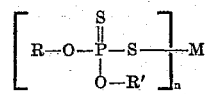

wherein R and R' are each selected from the class consisting of an alkyl group containing from 1 to 16 carbon atoms, monovalent aromatic hydrocarbon groups containing from 6 to 16 carbon atoms, and monovalent cycloalkyl hydrocarbon groups containing from 5 to 16 carbon atoms, and wherein M is a metal selected from Groups I–A, II–A, II–B and IV–B of the Mendeleeff Periodic System of Elements and $n$ is equal to the valence of said metal.

*Table I*

| Additive | Structure | Time to Embrittlement at 150° C. (hrs.) | Melt Index of Composition after 15 min. at 300° C. |
|---|---|---|---|
| None | | <6 | >100 |
| 4,4'-thiobis(6-tert-butyl-m-cresol) | (structure: two methyl-phenol rings linked by S, with t-$C_4H_9$ groups and OH groups) | 24–48 | ≫100 |
| potassium diisopropyldithiophosphate | $iC_3H_7O-\overset{\overset{S}{\|}}{P}(O-iC_3H_7)-S-P$ | <6 | 16 |
| zinc diisopropyldithiophosphate | $[i-C_3H_7O-\overset{\overset{S}{\|}}{P}(O-iC_3H_7)-S-]_2 Zn$ | <6 | 14 |
| cadmium diisopropyldithiophosphate | $[i-C_3H_7O-\overset{\overset{S}{\|}}{P}(O-iC_3H_7)-S-]_2 Cd$ | <6 | 15 |

It is clear from the data of Table I that the stabilizing action at high temperatures of the dithiophosphate salts 2. The composition of claim 1 in which R and R' are each alkyl groups containing from 1 to 16 carbon atoms and M is a metal of Group II–B of the Mendeleeff Periodic System of Elements.

3. The heat stabilized polypropylene composition of claim 1 in which the dithiophosphate salt stabilizer is present in an amount of from about 0.01 to about 2.0 parts by weight per 100 parts by weight of said polypropylene.

4. The heat stabilized polypropylene composition of claim 2 in which the dithiophosphate salt stabilizer is present in an amount of from about 0.05 to about 0.50 part by weight per 100 parts by weight of said polypropylene.

5. The heat stabilized polypropylene composition of claim 3 in which the stabilizer is potassium diisopropyldithiophosphate.

6. The heat stabilized polypropylene composition of claim 3 in which the stabilizer is zinc diisopropyldithiophosphate.

7. The heat stabilized polypropylene composition of claim 3 in which the stabilizer is cadmium diisopropyldithiophosphate.

References Cited in the file of this patent

UNITED STATES PATENTS

| | | |
|---|---|---|
| 2,552,570 | McNab et al. | May 15, 1951 |
| 2,739,122 | Kennerly et al. | Mar. 20, 1956 |
| 2,739,123 | Kennerly et al. | Mar. 20, 1956 |